United States Patent Office 3,431,138
Patented Mar. 4, 1969

3,431,138
METHOD FOR COATING PHARMACEUTICAL
FORMS WITH METHYL CELLULOSE
Joel Ronald Zingerman, Westfield, N.J., and Louis Nasir
Elowe, Madison, Conn., assignors to American Cyanamid Company, Stamford, Conn., a corporation of Maine
No Drawing. Continuation-in-part of application Ser. No. 343,944, Feb. 11, 1964. This application July 14, 1967, Ser. No. 653,345
U.S. Cl. 117—100           2 Claims
Int. Cl. C08b 21/26

ABSTRACT OF THE DISCLOSURE

Invention relates to a method of applying a pharmaceutical coating composition composed of ethanol, chloroform and low viscosity methylcellulose to a moving mass of pharmaceutical forms such as tablets, granules, pills and the like, heated to a temperature of from about 50 to 70° C.

---

This application is a continuation-in-part of our copending application Ser. No. 343,944 filed Feb. 11, 1964, now abandoned.

Generally stated, the subject matter of the present invention relates to a pharmaceutical coating system. More particularly, the invention provides an improved pharmaceutical coating composition comprising low viscosity methylcellulose, as well as a method for coating pharmaceutical coating composition comprising low viscosity like with said coating composition.

Coatings are generally applied to pharmaceutical forms to protect the ingredients against the atmosphere, to mask unpleasant tastes and odors, to improve the appearance as well as providing for coloring and printing. In recent years, cellulose derivatives have gained a wide acceptance as coating materials for pharmaceutical forms. The coatings of the prior art, however, are usually tacky, uneven, require extensive polishing after coating, and are damaged when an attempt is made to print the coated pharmaceutical forms employing conventional printing techniques. Unsuccessful attempts have been made to overcome said disadvantages of cellulosic coating compositions, and it is with the alleviation of these disadvantages that the present invention is primarily concerned.

The present invention represents the culmination of a long series of investigations conducted largely by the inventors and their associates in the problems occasioned by the coating of pharmaceutical forms with cellulosic coating compositions. The present invention resides in the discovery that the foregoing problems may be successfully overcome by employing a low viscosity methylcellulose coating composition in which the methylcellulose is dissolved in a mixture of ethanol and chloroform. While low viscosity methylcellulose has a number of desirable features in terms of its use as a coating material, efforts to apply a coating composition comprising methylcellulose to a mass of pharmaceutical forms were unsuccessful. The coating did not apply smoothly and the pharmaceutical forms became tacky during the drying cycle. Attempts to overcome these difficulties through the teachings of the prior art were unsatisfactory, and further innovation was necessary to achieve the desired results. It was found that when the temperature of a moving mass of pharmaceutical forms was maintained at about 50 to 70° C., the objective of pharmaceutical elegance was achieved.

Therefore, the invention also resides in applying said composition to a heated, moving mass of pharmaceutical forms.

Therefore, the invention relates to a pharmaceutical coating composition comprising, as a vehicle, from about 50 to 60% by weight of ethanol, and from about 35–45% by weight of chloroform, said vehicle having admixed therein from about 2 to 5% by weight of low viscosity methylcellulose.

In addition, the invention relates to a method for applying the above cellulosic coating composition to pharmaceutical forms, which comprises the steps of applying to a moving mass of said forms, heated to a temperature of from about 50 to 70° C., a portion of the aforementioned coating composition.

The advent of the novel coating composition and method of the present invention has brought about a number of innovations in the coating arm. The novel composition of the present invention readily adapts itself to the newer techniques of coating. Further advantages are realized in the process of applying cellulosic coating compositions to pharmaceutical forms, since no dusting material is necessary to prevent the tablets from becoming tacky, nor is polishing required, since the utilization of both the coating composition and the method of the present invention provides a coating which is pharmaceutically elegant. Therefore, the novel composition and method of the present invention achieves a uniform, non-tacky coating which does not require additional polishing, and can be conventionally printed without damage to the coating.

The term low viscosity methylcellulose as employed in the instant specification and claims shall be defined to mean that low viscosity methylcellulose having a viscosity of from about 10–50 cps. The preferred low viscosity methylcellulose is one having a viscosity of about 10 cps.

The novel cellulosic coating composition of the present invention may also contain suitable quantities of plasticizers or non-volatile solvents for the low viscosity methylcellulose such as liquid petrolatum, propylene glycol, glycerine or polyethylene glycol in order to improve the flexibility and smoothness of the finished coating layer. The composition may also optionally contain small amounts of water to facilitate solution of water soluble coloring principles and other water soluble constituents that may be present. In addition to the plasticizers, the composition may also contain certain pharmaceutically acceptable coloring principles which are well known to the pharmaceutical art. The coloring principles are described in Remington's Practice of Pharmacy, Eleventh Edition, pp. 1158–1166, as "Natural Coloring Principles" and "Synthetic Coloring Principles," these pages are incorporated by reference as a part of the present specification.

A preferred cellulosic coating composition which is representative of the invention would contain about 55% by weight of ethanol, about 40% by weight of chloroform, about 3.6% by weight of low viscosity methylcellulose, 0.1 to 1% of liquid petrolatum as a plasticizer, and 0.1 to 1% by weight of a coloring principle. This composition, subsequent to admixture, is then ready for application to a pharmaceutical form such as a tablet. Prior to applying the novel cellulosic coating composition of the present invention to a pharmaceutical form such as a tablet, the tablet is preferably first coated with a prime coat which may suitably be confectionary glaze. The pharmaceutical forms to be coated are placed in a coating container, such as a coating pan, which is then rotated at a speed at which maximum tumbling effect of the mass of pharmaceutical forms is achieved. The confectionary glaze is then poured slowly over the moving mass from a graduate. A preferred procedure requires two thick coatings of confectionary glaze prior to the application of the cellulosic coating composition.

Heating of the moving mass of pharmaceutical forms can be achieved by any of the conventional heating methods, such as a steam jacketed coating pan. The novel cellulosic coating composition of the present invention may be applied to the heated, moving mass of pharmaceutical forms by spraying, and the coating may take place in a coating pan, column, tower, rotating cylinder and other suitable devices. Movement of the mass usually involves the use of baffles, vibrating devices, or fluidization of the mass to provide movement. Furthermore, removal of the cellulosic coating composition solvent may be effected by directing a jet of heated gas, such as air, onto the surface of the mass or through a fluidized bed either during the drying cycle or continuously during coating.

Broadly stated, the novel process of the present invention entails charging a coating container, such as a coating pan fitted with baffles, with a sufficient amount of pharmaceutical forms. The coating container is then rotated to achieve a maximum tumbling effect of the pharmaceutical forms, and the mass is heated to a temperature of about 50 to 70° C. The novel cellulosic coating composition of the present invention is then applied to the heated moving mass of pharmaceutical forms. The mass is then dried by directing a heated gas over the moving mass either continuously during coating, or intermittently to the coating step.

It is generally observed, as demonstrated in the following examples, that there is no sticking of the tablets to each other or to the pan, nor is any coating residue left in the pan after coating. The coated pharmaceutical forms are evenly colored, smooth, glossy and can be handled without smudging the finish. Printing could be applied to the coated forms without damage to the coating, employing a conventional printing technique.

Lastly, it is observed that the coating represents about 2-6% of the weight of the coated pharmaceutical form. A further advantage is realized if the coating is to be colored, since less coloring principle is required per single pharmaceutical form, and although color is a contribution to the elegance of the finished product, it is preferred to employ as little coloring principle as possible to achieve a given color.

The following examples are provided for illustrative purposes and may include particular features of the invention, however, the examples should not be construed as limiting the invention, many variations of which are possible without departing from the spirit or scope thereof.

EXAMPLE 1

Preparation of a cellulosic coating composition with a water soluble dye colorant A cellulosic coating composition consisting of the following ingredients is prepared:

| Ingredient: | Percent |
| --- | --- |
| Methylcellulose, 10 cps. | 3.57 |
| Eethanol | 55.10 |
| Chloroform | 41.30 |
| D&C Yellow No. 11 Dye | 0.03 |

The coating composition is prepared by first adding the D&C Yellow No. 11 dye to the ethanol. Methylcellulose is then dissolved in the above mixture, which is being stirred, by fluffing it slowly onto the mixture. The mixture is then mixed for an additional 2 minutes. The chloroform is then added slowly with adequate mixing for approximately 2 minutes.

EXAMPLE 2

Preparation of a cellulosic coating composition containing a pigment colorant

A coating composition consisting of the following ingredients is prepared:

| Ingredient: | Percent |
| --- | --- |
| Methylcellulose, 10 cps. | 3.54 |
| Eethanol | 55.10 |
| Chloroform | 41.30 |
| D&C Red No. 77 Lake with $TiO_2$ | 0.03 |
| Mineral oil | 0.03 |

The coating composition is prepared by adding the methylcellulose to the ethanol, which is being stirred, by fluffing it slowly onto the ethanol. The mixture is then mixed for approximately 2 minutes. The chloroform is then added slowly with adequate mixing for approximately 2 minutes. The pigment colorant is then mixed with the mineral oil and added to the above mixture.

EXAMPLE 3

Utilization of the pharmaceutical coating system of the present invention

This example demonstrates the efficacy of employing the cellulosic coating composition and process of the present invention.

A conventional coating pan is loaded with 92 kg. of compressed demethylchlortetracycline tablets. The tablets are sealed in a conventional manner, employing confectionary glaze and kaolin to prevent sticking.

A steam jacketed coating pan is loaded with the sealed tablets hereinabove prepared and heated to 65° C. The pan is rotated at a speed at which maximum tumbling is achieved, and the temperature of the moving tablet mass is maintained at 65° C.

Approximately 80 liters of a cellulosic coating composition is prepared in the manner set forth in Example 1 and sprayed onto the heated, moving tablets. The spraying of the cellulosic coating composition is alternated with blowing air, heated to approximately 45° C., onto the tumbling tablets. This process is continued until the tablets are satisfactorily coated.

The coated tablets are then weighed, and it is found that the coating represents about 2% of the coated tablets. Furthermore, the tablets are evenly colored, smooth, glossy and can be handled without smudging the coating. In addition, there is no coating residue left in the coating pan.

EXAMPLE 4

Utilization of the pharmaceutical coating system of the present invention

This example demonstrates the efficacy of employing the cellulosic coating composition and process of the present invention.

A steam jacketed coating pan is loaded with 92 kg. of unsealed demethylchlortetracycline tablets, and the tablets are heated to a temperature of approximately 65° C. The coating pan is rotated at a speed at which maximum tumbling effect is achieved, and the temperature of the tablets is maintained at approximately 65° C.

Approximately 80 liters of a coating composition is prepared in the manner set forth in Example 2, and sprayed onto the heated, moving tablets. The tablets are coated in the same manner as set forth in Example 3.

The quality of the coating attained is substantially the same as that produced in Example 3.

What is claimed is:
1. A method for coating pharmaceutical forms which comprises applying to a rotating mass of said forms heated to a temperature of from 50° C. to 70° C. a coating composition comprising as a vehicle from about 50% to 60% by weight of ethanol and from about 35-45% by weight of chloroform, said vehicle having admixed therein 2–5% by weight of low viscosity methyl cellulose.

2. A method according to claim 1 in which the low viscosity methylcellulose is one having a viscosity of about 10 cps.

References Cited

UNITED STATES PATENTS

| | | | |
|---|---|---|---|
| 1,188,376 | 6/1916 | Lilienfeld | 260—231 |
| 1,394,505 | 10/1921 | Donohue | 106—189 |
| 2,602,042 | 7/1952 | Abbott | 167—84 |
| 2,881,085 | 4/1959 | Endicott et al. | 106—189 X |
| 2,814,618 | 11/1957 | Sloan | 260—232 |
| 2,949,402 | 8/1960 | Mehrabi-Nejad | 167—82 |
| 3,096,248 | 7/1963 | Rudzki | 117—100 X |
| 3,149,038 | 9/1964 | Jeffries | 117—166 X |
| 3,215,549 | 11/1965 | Ericson | 106—189 X |
| 3,253,944 | 5/1966 | Wurster | 117—100 |
| 2,865,868 | 12/1958 | McKinley | 117—100 X |

OTHER REFERENCES

Greminger et al., Methyl Cellulose and Its Derivatives, Industrial Gums (edited by Whistler et al.), Academic Press, (1959) New York, pp. 570–1.

Hackh, Hackh's Chemical Dictionary, P. Blakiston's and Sons, Philadelphia, pp. 697–8.

WILLIAM D. MARTIN, *Primary Examiner.*

MATHEW R. P. PERRONE, JR., *Assistant Examiner.*

U.S. Cl. X.R.

106—189, 190